United States Patent
Levine-Fraiman

(10) Patent No.: US 9,349,005 B2
(45) Date of Patent: May 24, 2016

(54) PREVENTING RE-PATCHING BY MALWARE ON A COMPUTER

(71) Applicant: International Business Machines Corporation, Armonk, NY (US)

(72) Inventor: Ilan Levine-Fraiman, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/305,047

(22) Filed: Jun. 16, 2014

(65) Prior Publication Data

US 2015/0363597 A1      Dec. 17, 2015

(51) Int. Cl.
*H04L 29/00* (2006.01)
*G06F 21/56* (2013.01)

(52) U.S. Cl.
CPC ........................... *G06F 21/56* (2013.01)

(58) Field of Classification Search
CPC .................. G06F 12/16; G06F 21/56
USPC ........................................ 726/22, 23
See application file for complete search history.

(56) References Cited

U.S. PATENT DOCUMENTS

| | | | |
|---|---|---|---|
| 7,418,729 B2 * | 8/2008 | Szor | 726/22 |
| 8,239,940 B2 | 8/2012 | Klein et al. | |
| 8,595,836 B2 | 11/2013 | Klein et al. | |
| 2014/0150098 A1 * | 5/2014 | Hardy | 726/22 |

* cited by examiner

*Primary Examiner* — Jeffrey Pwu
*Assistant Examiner* — Michael D Anderson
(74) *Attorney, Agent, or Firm* — Adolph Bohnstedt; Isaac J. Gooshaw

(57) ABSTRACT

Preventing re-patching by malware on a computer by detecting a request to modify a write-protection attribute of a memory location within a memory of a computer to allow the memory location to be written to, where the detecting is performed subsequent to the detection of activity identified as malware-related activity involving the memory location, and preventing modification of the write-protection attribute of the memory location.

17 Claims, 3 Drawing Sheets

PREVENTING RE-PATCHING BY MALWARE ON A COMPUTER

BACKGROUND OF THE INVENTION

The present invention relates generally to error detection, and more particularly, to identification of actions leading to error events.

Malware is malicious software whose only purpose is to damage or perform other unwanted actions on computer systems. Generally, malware is any software used to disrupt computer operation, gather sensitive information, or gain access to private computer systems. Various forms of malware may allow individuals to, in a non-inclusive list, steal passwords and banking credentials; hack into social media accounts; access documents, photos, and other computer files; record keystrokes; activate webcams; hold a computer for ransom; and use the computer in distributed denial of service (DDoS) attacks. Malware can appear in the form of code, scripts, active content, and other software.

Some types of computer malware operate by inserting malicious software instructions into portions of a computer's memory that are marked as executable, an operation that is referred to herein as "patching," such as to overwrite some or all of an existing function that is called during normal computer operation.

SUMMARY

In one aspect of the invention a computer security method is provided including detecting a request to modify a write-protection attribute of a memory location within a memory of a computer to allow the memory location to be written to, where the detecting is performed subsequent to the detection of activity identified as malware-related activity involving the memory location, and preventing modification of the write-protection attribute of the memory location.

In other aspects of the invention, systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Embodiments of the present invention recognize that while known anti-patching techniques may be used to identify and remove such malicious software instructions, or "patches," from a computer's memory, some malware are configured to detect the removal of their patches and respond by "re-patching" their patches into the same memory locations from which their patches were removed, often rendering known anti-patching techniques ineffective. Embodiments of the present invention monitor and block requests to change write-protection attributes of memory locations, in particular, to memory locations which have previously been "repaired" or restored to their original state from changes attributed to malware activity. Additionally, embodiments of the present invention can effectively handle errors that preventing such blocked requests may cause—thereby allowing processes to continue execution.

Figure 1:
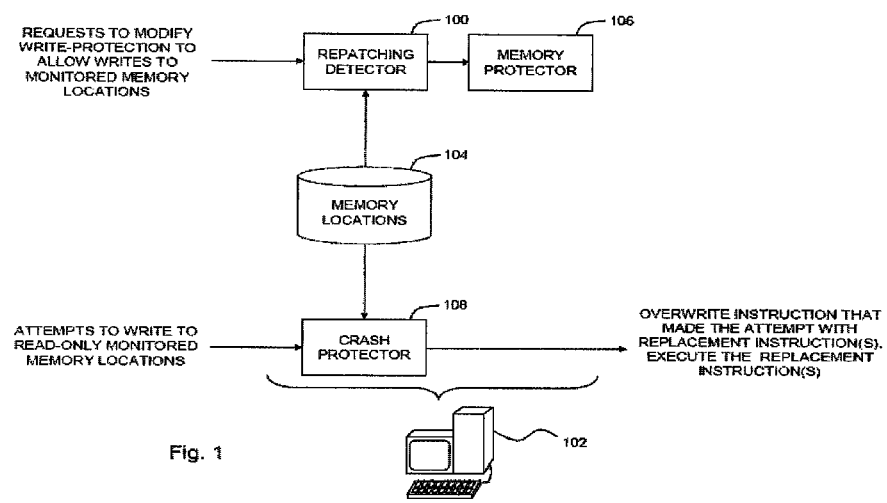
FIG. 1 is a simplified conceptual illustration of a system for preventing re-patching by malware on a computer, constructed and operative in accordance with an embodiment of the invention.

Reference is now made to FIG. 1 which is a simplified conceptual illustration of a computer security system for preventing re-patching by malware on a computer, constructed and operative in accordance with an embodiment of the invention. In the system of FIG. 1 a re-patching detector 100 is configured to detect requests to modify the write-protection attributes (often implemented as protection flags) of memory locations within a memory of a computer, such as of a computer 102, to allow the memory locations to be written to, such as by requesting that a memory location that is marked as "read only" be marked as "read/write." Re-patching detector 100 preferably detects such requests regarding specific memory locations maintained by re-patching detector 100 in a data store 104 of memory locations where activity identified as malware-related activity involving the memory locations was previously identified. The malware-related activity may, for example, involve patching of a memory location by malware, as may be detected and remediate using anti-patching software, which may provide a notification to re-patching detector 100 of the detected malware-related activity and the related memory location, which latter information re-patching detector 100 preferably maintains in data store 104. Re-patching detector 100 is preferably configured to detect such requests to modify the write-protection attributes of memory locations, such as may be made by a computer software application during its execution by a computer, by intercepting calls to low-level memory functions, such as to the VirtualProtect and NtProtectVirtualMemory API functions on computers running the Microsoft Windows® operating system, although the invention is applicable to other operating systems that are vulnerable to patching.

The system of FIG. 1 also includes a memory protector 106 configured to prevent modification of the write-protection attributes of the memory locations, with regard to detected requests to modify the write-protected attributes by re-patching detector 100. For example, memory protector 106 may prevent such modifications by withholding the intercepted requests from their intended functions.

The system of FIG. 1 may also include a crash protector 108 configured to detect an attempt by a computer software instruction to write to any of the memory locations in data store 104 whose write-protection attributes are set to "read only," where the computer software instruction belongs to a process that is executed by the computer in whose memory the memory locations are found. For example, crash protector 108 may detect such requests on computers running the Microsoft Windows® operating system by setting a vectored exception handler using the AddVectoredExceptionHandler API function. Thus, when re-patching detector 100 detects a request to modify the write-protection attribute of a memory location from "read only" to "read/write," and memory protector 106 prevents the modification, leaving the memory location as "read only," should an attempt then be made to write to the memory location, an exception will be thrown, which will be handled by crash protector 108, and which, in one embodiment, identifies the computer software instruction that caused the exception. In one embodiment, crash protector 108 may be configured to overwrite the computer software instruction that caused the exception with one or more replacement computer software instructions, such as with one or more "no operation" (NOP) commands. Crash protector 108 may subsequently cause the process to execute the replacement computer software instruction(s), such as by returning an EXCEPTION_CONTINUE_EXECUTION value in the vectored exception handler.

Any of the elements shown in FIG. 1 are preferably implemented by one or more computers, such as by computer 102, in computer hardware and/or in computer software embodied in a computer readable storage medium in accordance with conventional techniques.

Figure 2:
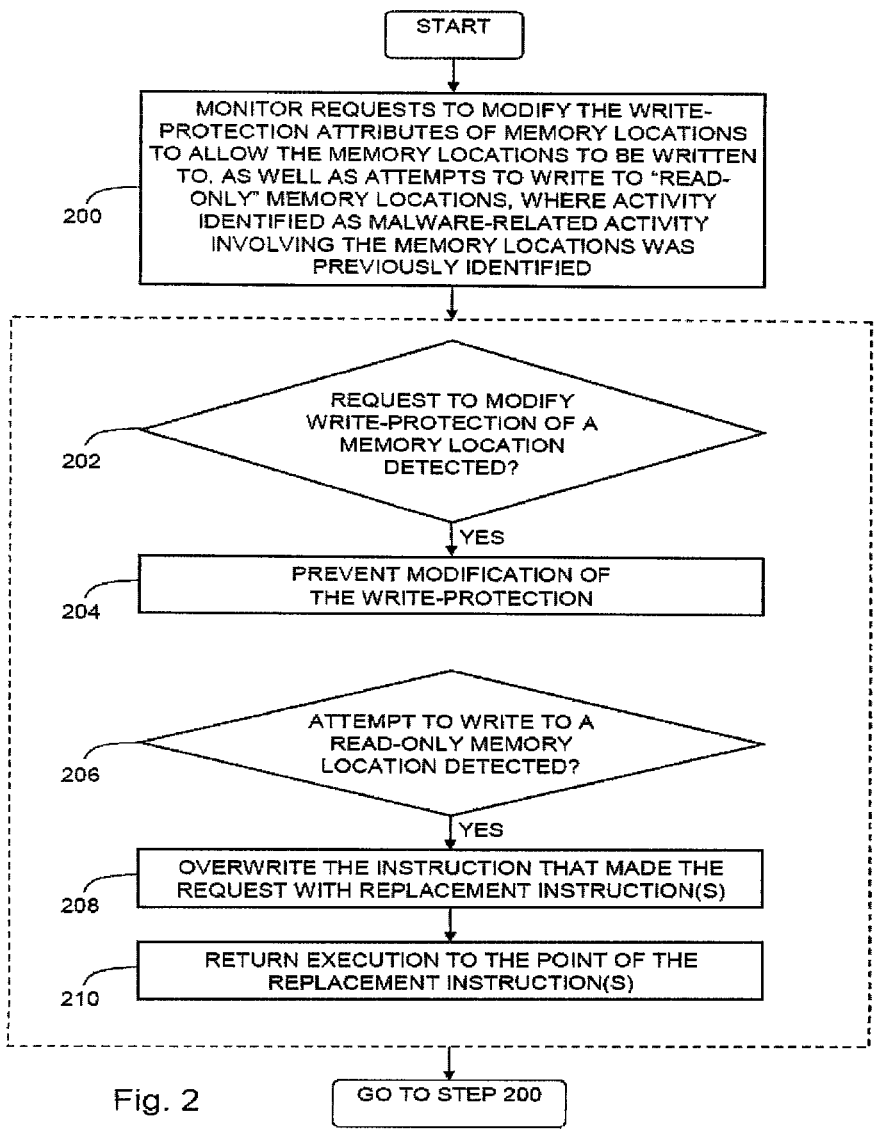
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, requests to modify the write-protection attributes of memory locations within a memory of a computer to allow the memory locations to be written to, as well as attempts to write to "read-only" memory locations are monitored, especially in instances where activity identified as malware-related activity involving the memory locations was previously identified (step 200). In one embodiment, if a malicious patch is detected and removed by anti-patching mechanisms, the memory location that was patched is added to a list of memory locations to be monitored for "re-patching" activity. If a request to modify the write-protection attributes of a memory location to allow the memory location to be written to is detected (step 202), modification of the write-protection attributes of the memory location is prevented (step 204). Embodiments of the invention monitor for attempts to write to a "read-only" memory location (step 206). In one implementation, any attempted write to a read-only memory location is detected. In another implementation, embodiments of the present invention specifically monitor memory locations in which an attempt at modification of write-protection attributes have been detected and prevented. Without proper handling, an attempted write to a read-only memory location can result in an application crash. If such an attempt occurs, an exception will be thrown and caught by a monitoring process of the present invention. Subsequent to detection of an attempt to write to a read-only memory location (e.g., by a caught exception), the computer software instruction that caused the exception is overwritten with one or more replacement computer software instructions (step 208), and execution of the process to which the computer software instruction that caused the exception is returned to the point of the replacement computer software instruction(s) (step 210).

Figure 3:
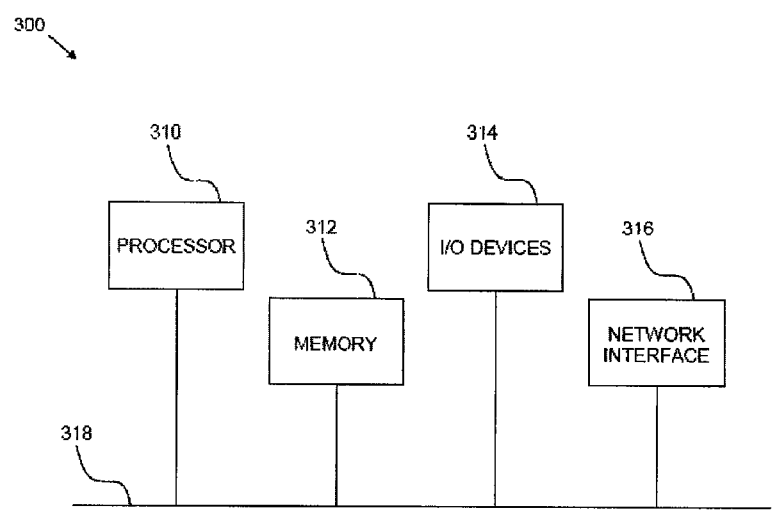
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Ruby, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer security method comprising:
   detecting, by one or more processors, a request to modify a write-protection attribute of a memory location within a memory of a computer, wherein the request seeks to allow the memory location to be written to, and wherein the memory location was previously subject to detected malware-related activity;
   preventing, by the one or more processors, modification of the write-protected attribute of the memory location;
   detecting, by the one or more processors, an attempt by a computer software instruction to write to the memory location, wherein the computer software instruction belongs to a process that is executed by the computer;
   overwriting, by the one or more processors, the computer software instruction with one or more replacement computer software instructions; and
   causing, by the one or more processors, the process to execute the one or more replacement computer software instructions.

2. The method of claim 1, wherein detecting the attempt to write to the memory location comprises setting an exception handler to detect a failed write to the memory location.

3. The method of claim 1, wherein the one or more replacement computer software instructions are "no operation" (NOP) instructions.

4. The method of claim 1, further comprising:
   prior to detecting the request to modify the write-protection attribute of the memory location, identifying, by the one or more processors, the memory location for monitoring responsive to detection and removal of a malicious patch affecting the memory location.

5. The method of claim 4, further comprising adding, by the one or more processors, the memory location to a list of memory locations to be monitored for subsequent attempts to modify write-protection attributes of the respective memory locations.

6. The method of claim 1, further comprising:
   responsive to preventing modification of the write-protected attribute of the memory location, adding, by the one or more processors, the memory location to a list of memory locations to monitor for subsequent attempts to write to the respective memory locations.

7. A computer program product for preventing malicious software repair, the computer program product comprising:
   one or more computer readable storage media; and
   program instructions stored on the one or more computer readable storage media, the program instructions comprising:
      program instructions to detect a request to modify a write-protection attribute of a memory location within a memory of a computer, wherein the request seeks to allow the memory location to be written to, and wherein the memory location was previously subject to detected malware-related activity;

program instructions to prevent modification of the write-protected attribute of the memory location;

program instructions to detect an attempt by a computer software instruction to write to the memory location, wherein the computer software instruction belongs to a process that is executed by the computer;

program instructions to overwrite the computer software instruction with one or more replacement computer software instructions; and program instructions to cause the process to execute the one or more replacement computer software instructions.

8. The computer program product of claim 7, wherein the program instructions to detect the attempt to write to the memory location comprise program instructions to set an exception handler to detect a failed write to the memory location.

9. The computer program product of claim 7, wherein the one or more replacement computer software instructions are "no operation" (NOP) instructions.

10. The computer program product of claim 7, further comprising program instructions, stored on the one or more computer readable storage media, to:

prior to detecting the request to modify the write-protection attribute of the memory location, identify the memory location for monitoring responsive to detection and removal of a malicious patch affecting the memory location.

11. The computer program product of claim 10, further comprising program instructions, stored on the one or more computer readable storage media, to add the memory location to a list of memory locations to be monitored for subsequent attempts to modify write-protection attributes of the respective memory locations.

12. The computer program product of claim 7, further comprising program instructions, stored on the one or more computer readable storage media, to:

responsive to preventing modification of the write-protected attribute of the memory location, add the memory location to a list of memory locations to monitor for subsequent attempts to write to the respective memory locations.

13. A computer system for preventing malicious software repair, the computer system comprising:

one or more computer processors;

one or more computer readable storage media; and program instructions stored on the one or more computer readable storage media for execution by at least one of the one or more computer processors, the program instructions comprising:

program instructions to detect a request to modify a write-protection attribute of a memory location within a memory of a computer, wherein the request seeks to allow the memory location to be written to, and wherein the memory location was previously subject to detected malware-related activity;

program instructions to prevent modification of the write-protected attribute of the memory location;

program instructions to detect an attempt by a computer software instruction to write to the memory location, wherein the computer software instruction belongs to a process that is executed by the computer;

program instructions to overwrite the computer software instruction with one or more replacement computer software instructions; and program instructions to cause the process to execute the one or more replacement computer software instructions.

14. The computer system of claim 13, wherein the program instructions to detect the attempt to write to the memory location comprise program instructions to set an exception handler to detect a failed write to the memory location.

15. The computer system of claim 13, wherein the one or more replacement computer software instructions are "no operation" (NOP) instructions.

16. The computer system of claim 13, further comprising program instructions, stored on the one or more computer readable storage media for execution by at least one of the one or more computer processors, to:

prior to detecting the request to modify the write-protection attribute of the memory location, identify the memory location for monitoring responsive to detection and removal of a malicious patch affecting the memory location.

17. The computer system of claim 16, further comprising program instructions, stored on the one or more computer readable storage media for execution by at least one of the one or more computer processors, to add the memory location to a list of memory locations to be monitored for subsequent attempts to modify write-protection attributes of the respective memory locations.

* * * * *